(12) United States Patent
Zhang et al.

(10) Patent No.: US 9,683,617 B2
(45) Date of Patent: Jun. 20, 2017

(54) SELF-LOCKING MECHANISM

(71) Applicant: Johnson Electric S.A., Murten (CH)

(72) Inventors: Yuan Chun Zhang, ShenZhen (CN); Fa Yun Qi, ShenZhen (CN); Jin An Nie, ShenZhen (CN); Rui Feng Qin, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 14/985,250

(22) Filed: Dec. 30, 2015

(65) Prior Publication Data

US 2016/0186819 A1     Jun. 30, 2016

(30) Foreign Application Priority Data

Dec. 30, 2014   (CN) .......................... 2014 1 0842590

(51) Int. Cl.

| *F16D 41/04* | (2006.01) |
|---|---|
| *B60T 13/74* | (2006.01) |
| *F16D 65/14* | (2006.01) |
| *F16D 121/24* | (2012.01) |
| *F16D 125/40* | (2012.01) |
| *F16D 125/48* | (2012.01) |
| *F16D 127/06* | (2012.01) |

(52) U.S. Cl.
CPC ............ *F16D 41/04* (2013.01); *B60T 13/746* (2013.01); *F16D 65/14* (2013.01); *F16D 2121/24* (2013.01); *F16D 2125/40* (2013.01); *F16D 2125/48* (2013.01); *F16D 2127/06* (2013.01)

(58) Field of Classification Search
CPC ...... F16D 65/14; F16D 41/04; F16D 2121/24; F16D 2125/40; F16D 2127/06; F16D 2125/48; B60T 13/746
USPC ..... 188/156, 157, 162, 265; 192/46; 310/92, 310/93, 77
See application file for complete search history.

(56) References Cited

U.S. PATENT DOCUMENTS

| 6,390,264 | B2 | 5/2002 | Torii et al. | |
|---|---|---|---|---|
| 7,880,351 | B2 * | 2/2011 | Strueber | F16D 41/10 310/77 |
| 8,177,040 | B2 * | 5/2012 | Matsushita | B60T 13/746 188/158 |
| 9,182,021 | B2 * | 11/2015 | Muramatsu | F16D 55/226 |
| 2014/0034432 | A1 * | 2/2014 | Bull | B60T 13/741 188/106 R |

(Continued)

*Primary Examiner* — Thomas J Williams
*Assistant Examiner* — Mariano Sy
(74) *Attorney, Agent, or Firm* — Muncy, Geissler, Olds & Lowe, P.C.

(57) ABSTRACT

A self-locking mechanism has a driving member, a driven member, a stationary member, a lock holder and a number of lock elements. The lock holder encircles the driving member and the driven member. The lock holder has a support base and ribs extending from the support base. A lock element is coupled to the axial end portion of each rib. The lock elements are radially positioned between a radially outer surface of the driven member and the inner wall of the stationary member. The distance between the radially outer surface and the inner wall gradually decreases from a center to opposite circumferential sides. The maximum distance between the radially outer surface and the inner wall is greater than the diameter of the lock element, and the minimum distance is less than the diameter of the lock element.

19 Claims, 10 Drawing Sheets

(56) References Cited

U.S. PATENT DOCUMENTS

| | | | |
|---|---|---|---|
| 2014/0166413 A1* | 6/2014 | Giering | B60T 13/741 188/156 |
| 2014/0182980 A1* | 7/2014 | Muramatsu | B60T 13/741 188/156 |
| 2015/0233434 A1* | 8/2015 | Hayashi | F16D 65/0006 188/72.6 |
| 2016/0210745 A1* | 7/2016 | Yoshida | G06K 9/6201 |
| 2016/0223040 A1* | 8/2016 | Watzek | F16D 65/50 |
| 2016/0273602 A1* | 9/2016 | Poertzgen | B60T 13/588 |
| 2016/0327104 A1* | 11/2016 | Li | F16D 65/0006 |
| 2016/0377137 A1* | 12/2016 | Ohlig | B60T 13/741 188/106 F |

* cited by examiner

SELF-LOCKING MECHANISM

CROSS REFERENCE TO RELATED APPLICATIONS

This non-provisional patent application claims priority under 35 U.S.C. §119(a) from Patent Application No. 201410842590.2 filed in The People's Republic of China on Dec. 30, 2014, the entire contents of which are hereby incorporated by reference.

FIELD OF THE INVENTION

This invention relates to an electric parking brake system for a vehicle and in particular, to a self-locking mechanism suitable for use in an electric parking brake system.

BACKGROUND OF THE INVENTION

A parking brake system for a vehicle is designed to prevent movement of a parked vehicle. A traditional parking brake system is manually operated. The driver needs to physically pull a lever to apply the parking brake. Electric parking brake (EPB) systems replace the traditional parking brake system. The EPB system includes a number of actuators, each driven by an electric motor, to operate the brakes of the vehicle. The actuator may include a lead screw or a ball screw. The user presses a button to operate the motor to rotate the lead screw or the ball screw of the actuator, thereby applying the brakes.

However, the actuator using the lead screw has a low efficiency. Although the use of the ball screw can improve the efficiency for the actuator, the actuator cannot self-lock. If the vehicle is positioned on a slope, the vehicle may start moving after applying the brakes as the actuator 'relaxes'. Alternatively, the motor needs to remain active the entire time the parking brake is active, which is not a desirable situation due to the obvious safety issues.

SUMMARY OF THE INVENTION

Hence there is a desire for a self-locking mechanism, especially, but not exclusively, suitable for use in an electric parking braking system and for an electric parking braking system incorporating a self-locking mechanism.

Accordingly, in one aspect thereof the present invention provides a self-locking mechanism, comprising: a driving member; a driven member arranged to drive the driving member; a stationary member; a number of lock elements; and a lock holder encircling the driving member and the driven member, for holding the lock elements, the lock holder comprising: a support base, and a plurality of ribs arranged on an inner wall of the support base in a circumferential direction of the support base, an axial end portion of each rib extending into the stationary member, wherein the driving member, the driven member, the stationary member, and the lock holder are coaxial with each other, a respective one of the lock elements is coupled to the axial end portion of each rib, and is positioned between an radially outer surface of the driven member and an inner wall of the stationary member; and a distance between the radially outer surface of the driven member and the inner wall of the stationary member gradually decreases from a center of the radially outer surface to opposite sides in a circumferential direction of the radially outer surface, a maximum distance between the radially outer surface of the driven member and the inner wall of the stationary member is greater than a diameter of the lock element, a minimum distance between the radially outer surface of the driven member and the inner wall of the stationary member is less than the diameter of the lock element, whereby, when the driving member rotates the driven member, the lock holder is rotated by the driving member to maintain each lock element substantially positioned at the center of the respective radially outer surface; and when the driven member is rotated by an external force, the radially outer surface of the driven member rotates relative to the lock element, thereby locking the lock element between the stationary member and the radially outer surface of the driven member preventing further rotation of the driven member.

Preferably, the stationary member is stacked on an axial end of the support base of the lock holder.

Preferably, at least one driving block is provided on the driving member, a plurality of stop blocks are provided on the driven member, the at least one driving block is disposed between the plurality of stop blocks, the at least one driving block is configured to engage the plurality of stop blocks to rotate the driven member, and an outer surface of each of the plurality of stop blocks is at least one portion of the radially outer surface of the driven member.

Preferably, the driving member and the driven member are sleeved on a shaft in an axial direction in sequence, the driving member is fixedly coupled to the shaft to rotate with the shaft, and the driven member is rotatably coupled to the shaft.

Preferably, the driving member further comprises a fixing portion, the fixing portion is fixedly coupled to the shaft, the at least one driving block extends radially outwardly from the fixing portion, an axial height of the at least one driving block is greater than an axial height of the fixing portion, a part of the at least one driving block extends from the fixing portion in the axial direction to define an installation space between the at least one driving block and the shaft, the driven member further comprises a connection portion extending into the installation space and rotatably sleeved on the shaft and each of the plurality of stop blocks extends radially outwardly from the connection portion.

Preferably, the at least one driving block comprises a plurality of driving blocks evenly distributed on the driving member in a circumferential direction of the driving member, the plurality of driving blocks and the plurality of stop blocks of the driven member are alternately positioned in the circumferential direction, the plurality of driving blocks and the plurality of ribs of the lock holder are alternately positioned in the circumferential direction.

Preferably, a cross section of each of the plurality of stop blocks is in a shape of isosceles trapezoid, an outer surface of each of the plurality of stop blocks towards the plurality of ribs is a substantially planar surface, and the lock element is positioned between the outer surface of each of the plurality of stop blocks and the inner wall of the stationary member.

Preferably, the at least one driving block comprises a first driving portion, and a second driving portion radially extending outwardly from the first driving portion, the first driving portion is configured to drive the plurality of stop blocks of the driven member, the second driving portion is configured to drive the plurality of ribs of the lock holder, a width of each first driving portion in the circumferential direction being less than a width of each second driving portion, and two sides of each second driving portion protrude over the corresponding first driving portion.

Preferably, each of the lock elements is substantially cylindrical, and an axis of each lock element is substantially parallel to an axis of the lock holder.

According to a second aspect, the present invention provides an actuator of an electric parking brake system, comprising a motor, an output member, and a transmission positioned between the motor and the output member, wherein the transmission incorporates a self-locking mechanism as defined above.

Preferably, the transmission further comprises a transmission mechanism and a planetary gear mechanism, the planetary gear mechanism comprises a gear housing, a sun gear, a planet carrier, and a plurality of planet gears, the sun gear, the planet carrier, and the plurality of planet gears are received in the gear housing, a fixture block protrudes from an outer surface of the gear housing for limiting rotation of the gear housing, a ring gear is arranged on an inner surface of the gear housing, the sun gear is fixedly coupled to an output gear of the transmission mechanism, the plurality of the planet gears are rotatably coupled to the planet carrier, each of the plurality of planet gears meshes with the sun gear and the ring gear, and the output member is coupled to the planet carrier.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
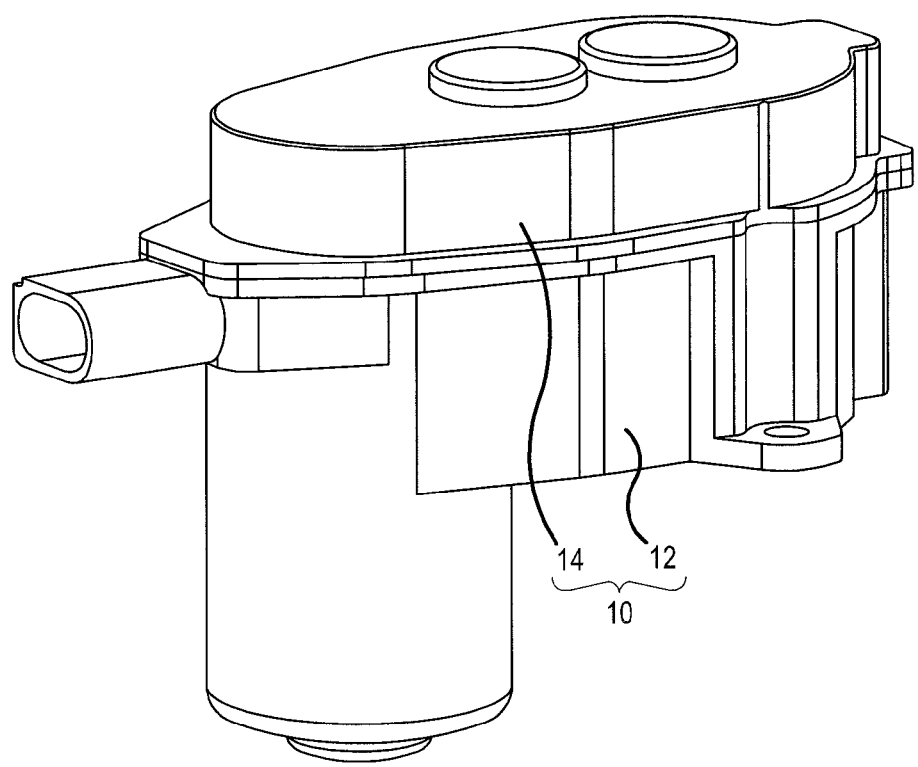
FIG. 1 illustrates an actuator of an electric parking brake system according to a preferred embodiment of the present invention.
Figure 2:
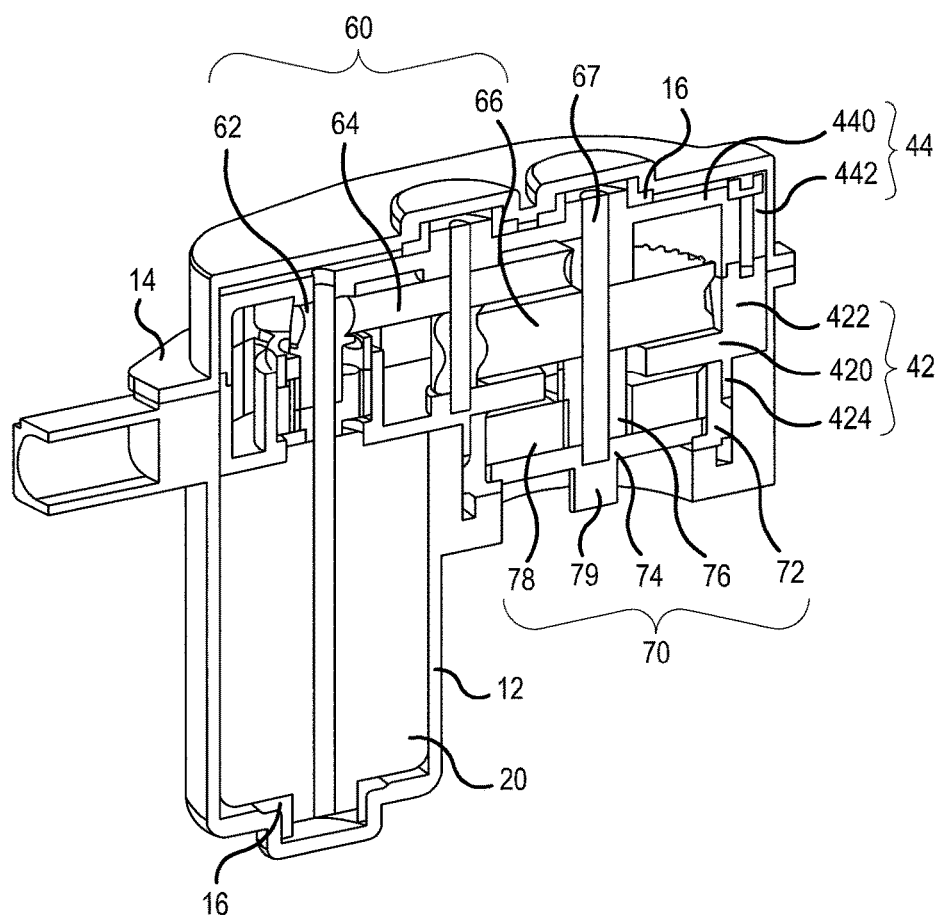
FIG. 2 is an isometric sectional view of the actuator of FIG. 1.
Figure 3:
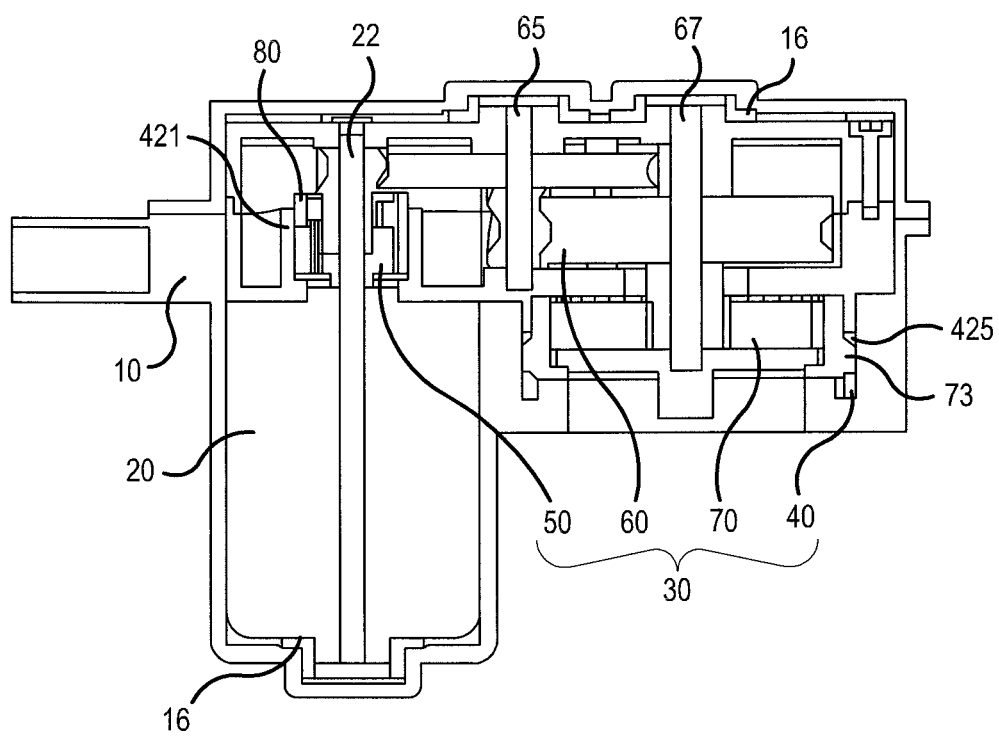
FIG. 3 is a front sectional view of the actuator of FIG. 2.
Figure 4:
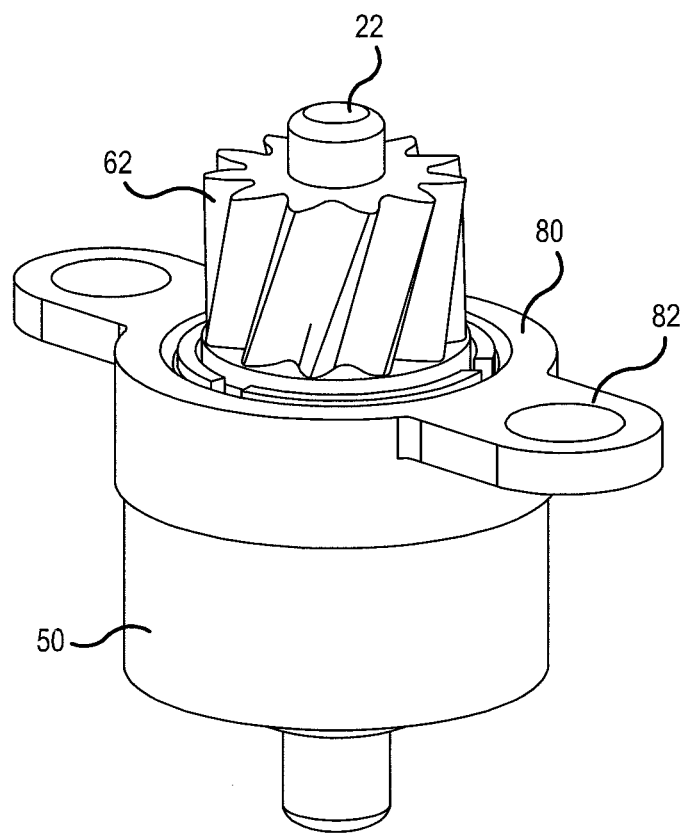
FIG. 4 is an isometric view of a self-locking mechanism of the actuator of FIG. 1.
Figure 5:
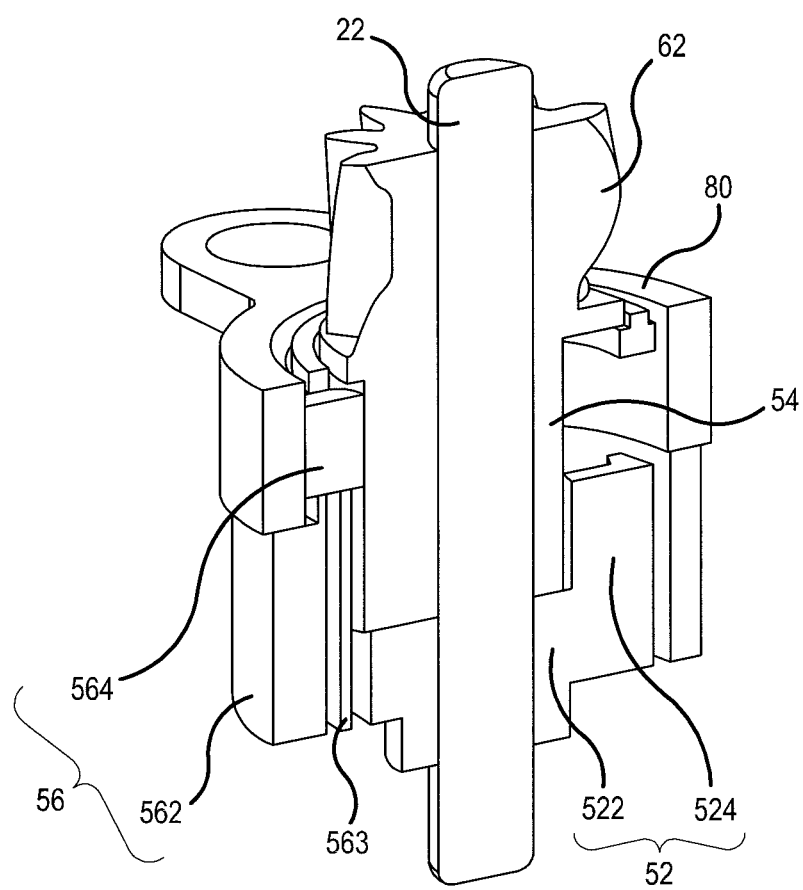
FIG. 5 is a sectional view of the self-locking mechanism of FIG. 4.
Figure 6:
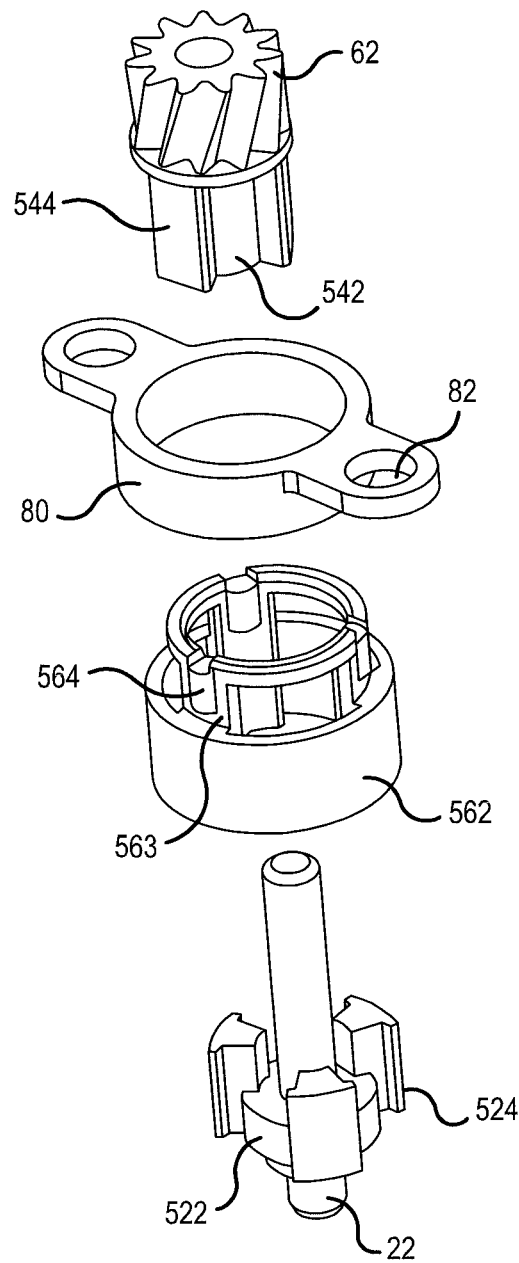
FIG. 6 is an exploded, isometric view of the self-locking mechanism of FIG. 4.
Figure 7:
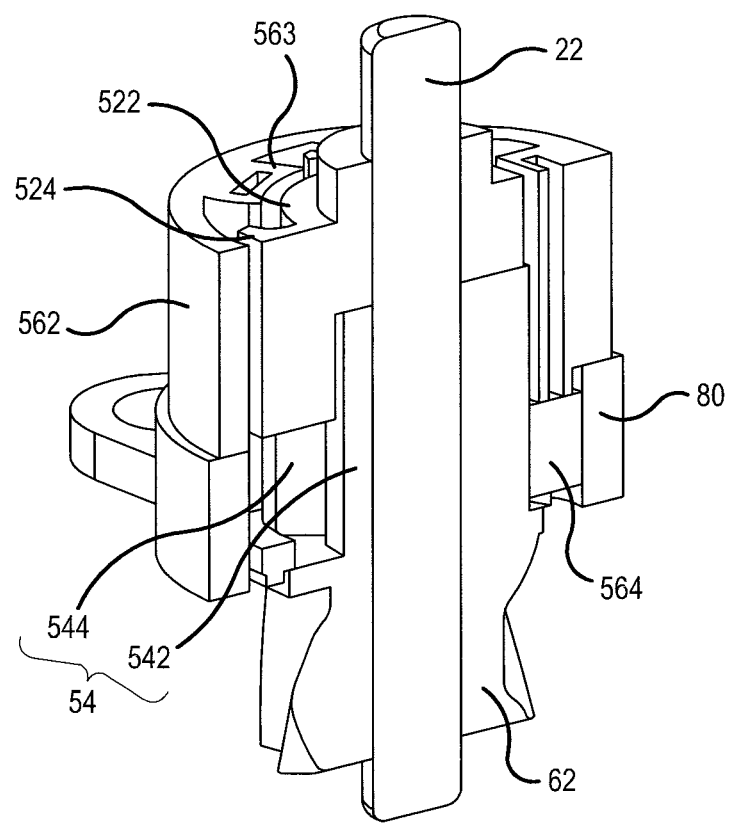
FIG. 7 is a view similar to FIG. 5, taken from another aspect.

FIGS. 1 to 3 show an actuator of an electric parking brake (EPB) system according to the preferred exemplary embodiment of the present invention. The actuator includes a two part casing 10, an electric motor 20 received in the casing 10, and a transmission 30 coupled to the motor 20.

The casing 10 includes a lower casing 12 and an upper casing 14 coupled to the lower casing 12. The lower casing 12 and the upper casing 14 cooperatively define a compartment in which the motor 20 and the transmission 30 are received. The motor 20 includes a rotor having a shaft 22, and the transmission 30 is coupled to the shaft 22. The shaft 22 rotates when the motor 20 is operated. The shaft 22 drives the transmission 30. A brake (not shown) of the EPB system is moved by an output member 79 to operate the brake. The transmission 30 is self-locking, meaning that the motor can drive the output member but an external force applied to the output member cannot drive the motor. Thus once the brake has been applied the motor can be deactivated and the brake will stay applied until the motor is operated to release the brake. The motor 20 is operated in the opposite direction (counter rotated) to drive the transmission 30 to release the brake.

In at least one embodiment, in order to reduce vibrations, at least one annular washer 16 is positioned between the motor 20 and the lower casing 12, and/or at least one annular washer 16 is positioned between the transmission 30 and the upper casing 14. The washers 16 can be made of rubber and/or other suitable materials which can absorb or buffer vibrations from the motor 20 and the transmission 30.

The transmission 30 includes a housing 40, a self-locking mechanism 50 received in the housing 40, a transmission mechanism 60 coupled to the self-locking mechanism 50, and a planetary gear mechanism 70 coupled to the transmission mechanism 60.

The housing 40 includes a base 42 and a cover 44 fixed to the base 42. The base 42 includes a substrate 420, a side wall 422 perpendicularly extending from an edge of the substrate 420 towards the cover 44, and a lower wall 424 perpendicularly extending from an edge of the substrate 420 in a direction away from the cover 44. The cover 44 includes a top plate 440 and a side wall 442 perpendicularly extending from an edge of the top plate 440 towards the substrate 420. Preferably, the top plate 440 is substantially parallel to and spaced from the substrate 420. Preferably, the sizes and shapes of the top plate 440 and the substrate 420 are identical or substantially identical. The side wall 442 of the cover 44 contacts the side wall 422 of the base 42. Thus the housing 40 defines a receiving space between the base 42 and the cover 44. The self-locking mechanism 50 and the transmission mechanism 60 are received in the receiving space of the housing and arranged side by side. The self-locking mechanism 50 is positioned at an axial end of the motor while the transmission mechanism 60 is positioned laterally of the motor 20.

The lower wall 424 of the base 42 may form a hollow cylinder, extending outwardly from the substrate 420 in a direction away from the transmission mechanism 60. The planetary gear mechanism 70 is received in the hollow cylinder formed by the lower wall 424. Rotation of the motor 20 is transmitted to the output member 79 through the self-locking mechanism 50, the transmission mechanism 60, and the planetary gear mechanism 70, to operate the brake, either to apply the brake or to release the brake. The self-locking mechanism 50 can prevent an external force from back driving the motor, either to apply or more importantly to release the brake. Hence, once applied the brake remains applied until the motor is operated to release the brake.

Referring to FIGS. 4 to 7, the self-locking mechanism 50 includes a driving member 52, a driven member 54, a lock holder 56, and a stationary member 80. The driving member 52, the driven member 54, the lock holder 56, and the stationary member 80 are coaxial with each other. The driving member 52 and the driven member 54 are sequentially sleeved on the shaft 22. The lock holder 56 is sleeved on an outside of the driving member 52 and the driven member 54. The driving member 52 is fixedly coupled to the shaft 22 and rotates with the shaft. The driven member 54 is rotatably sleeved on the shaft 22 and can rotate relative to the shaft 22. The driving member 52 is arranged to rotate the driven member 54 about the shaft.

An opening is defined in the substrate 420. The shaft 22 passes through the opening of the substrate 420. A fixed seat 421 is arranged on the substrate 420. The fixed seat 421 is a side wall surrounding the opening and extends from the substrate 420 into the receiving space. The fixed seat 421 may be coaxial with the opening, and an inner diameter of the fixed seat 421 is slightly greater than a diameter of the opening. In at least one embodiment, the self-locking mechanism 50 is rotatably received in the fixed seat 421. In order to reduce friction during rotation, the diameter of the opening of the substrate 420 is larger than a diameter of the shaft 22, and preferably larger than or equal to an external diameter of the driven member 54. An external diameter of the lock holder 56 of the self-locking mechanism 50 is slightly less than the inner diameter of the fixed seat 421.

The lock holder 56 includes a support base 562 and a plurality of lock elements 564 arranged on the support base 562. The support base 562 is received in the fixed seat 421 and is carried on the substrate 420. Preferably, the support base is in the form of a ring. In at least one embodiment, in order to reduce contact areas, an inner diameter of the support base 562 is greater than the diameter of the opening of the substrate 420. In an alternative embodiment, the inner diameter of the support base 562 is designed to be equal to or slightly less than the diameter of the opening of the substrate 420. The stationary member 80 is stacked on the support base 562. The stationary member 80 is substantially hollow circular shaped, so that the shaft 22 can pass through the stationary member 80. Two lugs 82 respectively extend from the stationary member 80, and the fixed seat 421 further includes two lugs for fixing the stationary member to the housing 40. The stationary member 80 may be fixed on the fixed seat 421 by screws or other connection elements passing through the of lugs 82 of the stationary member 80 and the corresponding lugs of the fixed seat 421. Therefore, the lock holder 56 is sandwiched between the stationary member 80 and the substrate 420, for positioning the lock holder 56 axially.

A plurality of ribs 563 are arranged protruding from an inner wall of the support base 562. In at least one embodiment, the ribs 563 are evenly arranged in a circumferential direction of the support base 562. Preferably, an internal face of each rib 563 is substantially arc-shaped with the arc-shaped internal face of each rib 563 being located on an imaginary cylindrical surface which is coaxial with the support base 562. The arc-shaped internal face of each rib 563 may form a part of the imaginary cylindrical surface. A diameter of the imaginary cylindrical surface is less than the inner diameter of the support base 562. An axial end portion of each rib 563 extends from the support base 562 and reaches into the stationary member 80. A lock element 564 is rotatably supported by the axial end portion of each rib 563. A groove is defined at each rib 563 for receiving a corresponding lock element 564. The groove radially intersects the rib 563. The lock element 564, in a radial direction of the lock holder 56, extends beyond the inner and outer radial sides of the rib 563. An axis of the lock element 564 on each rib 563 is parallel or substantially parallel to an axis of the lock holder 56. In at least one embodiment, each of the lock elements 564 is a cylindrical roller. The lock elements 564 are symmetrically positioned around the axis of the lock holder 56.

The driving member 52 is disposed in the support base 562. The driving member 52 includes a fixing portion 522 fixedly coupled to the shaft 22, and a plurality of driving blocks 524 radially extending outwardly from the fixing portion 522. An external diameter of the fixing portion 522 is less than a diameter of an inscribed circle of one of the ribs 563. Therefore, there is no contact between the fixing portion 522 and the ribs 563 of the lock holder 56 during rotation of the fixing portion 522. In at least one embodiment, the driving blocks 524 are evenly arranged in a circumferential direction of the fixing portion 522. The number of the driving blocks 524 may be equal to the number of the ribs 563 of the lock holder 56. When assembled, each driving block 524 is located between two adjacent ribs 563. Therefore, the driving blocks 524 of the driving member 52 and the ribs 563 of the lock holder 56 are alternately positioned in the circumferential direction.

Figure 8:
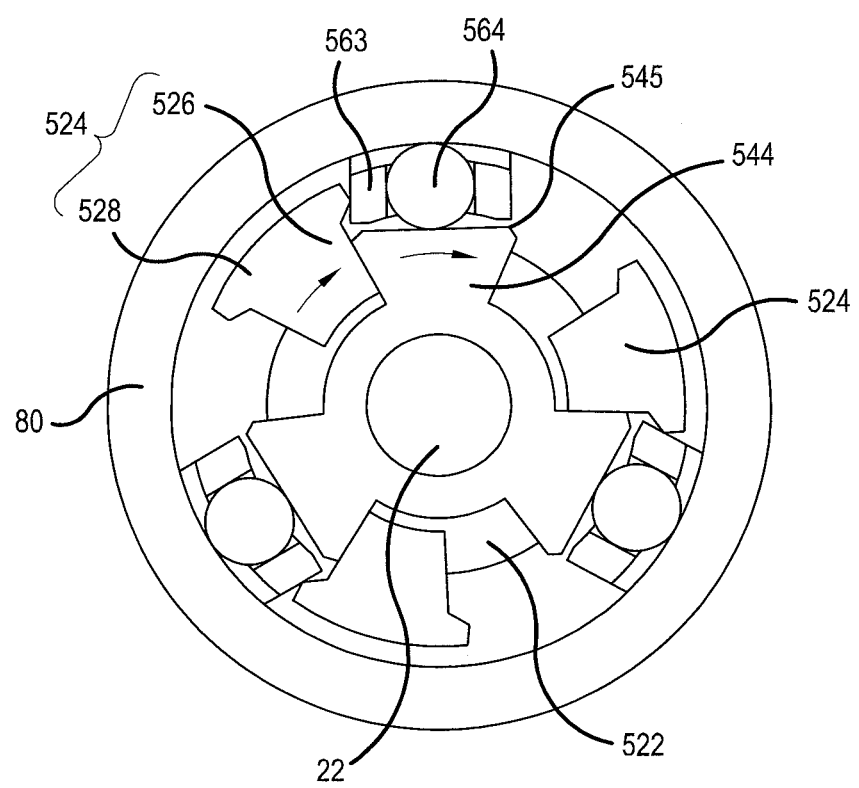
FIG. 8 is a schematic view of a first status of the self-locking mechanism when braking.

As shown in FIG. 8, each driving block 524 includes a first driving portion 526 radially extending outwardly from the fixing portion 522, and a second driving portion 528 further extending outwardly from a radial end of the first driving portion 526. A width of each first driving portion 526 in the circumferential direction is less than a width of each second driving portion 528. Opposite sides of each second driving portion 528 protrude over the corresponding first driving portion 526. The first driving portions 526 are configured to interact with the driven member 54. The second driving portions 528 are configured to interact with the ribs 563 of the lock holder 56. A diameter of an end portion of the second driving portion 528 is larger than a diameter of the cylindrical surface mentioned above, but slightly less than the inner diameter of the support base 562, to avoid contact with the inner wall of the support base 562. In at least one embodiment, an axial length of the driving block 524 is greater than an axial length of the fixing portion 522. An axial end or top of the driving block 524 protrudes axially passed the fixing portion 522, and surrounds the shaft 22. Therefore, a circular installation space is defined between the driving block 524 and the shaft 22, in which the driven member 54 is disposed.

The driven member 54 includes a connection portion 542 rotatably sleeved on the shaft 22, and a plurality of stop blocks 544 radially extending outwardly from the outer circumferential surface of the connection portion 542. The stop blocks 544 are evenly arranged in a circumferential direction of the driven member 54. Preferably, the number of the stop blocks 544 is equal to the number of the driving blocks 524 of the driving member 52. In at least one embodiment, the connection portion 542 extends into the circular installation space defined between the driving block 524 and the shaft 22. Each stop block 544 is located between two adjacent driving blocks 524. Therefore, the driving blocks 524 of the driving member 52 and the stop blocks 544 of the driven member 54 are alternately positioned in the circumferential direction. Each stop block 544 corresponds to one rib 563 of the lock holder 56 in the radial direction.

In at least one embodiment, a cross section of each stop block 544 is in a shape of an isosceles trapezoid or in a shape of substantially isosceles trapezoid. Preferably, an outer surface 545 of each stop block 544 towards the rib 563 is substantially planar. A distance between the outer surface 545 and an axis or an axial center line of the driven member 54 gradually increases from the center of the outer surface 545 to the opposite sides in the circumferential direction of the outer surface 545. Therefore, a distance between the outer surface 545 and an inner wall of the stationary member 80 gradually decreases from the center to the opposite sides in the circumferential direction of the outer surface 545. The distance between the outer surface 545 and the inner wall of the stationary member 80 is a maximum at the circumferential center of the outer surface and this distance is slightly larger than the diameter of the lock element 564. The distance between the circumferential sides of the outer surface 545 and the inner wall of the stationary member 80 is less than the diameter of the lock element 564. Therefore, when the lock element 564 is located at a position which corresponds to the center of the outer surface 545, the driven member 54 can rotate relative to the stationary member 80. When the lock holder 56 is motionless, rotation of the driven member 54 relative to the lock holder 56 would move the lock elements to a circumferential side of the outer surface 545, wedging the lock elements between the stationary member and the driven member 54, thereby preventing father rotation of the driven member 54.

As shown in FIG. 2 and FIG. 3, the transmission mechanism 60 can be a multi-stage gear drive. The transmission mechanism 60 includes an input gear 62, a middle gear 64, and an output gear 66 which are sequentially meshed. The input gear 62 is integrated with the driven member 54 and sleeved on the shaft 22. The middle gear 64 is coupled between the top plate 440 of the housing 40 and the substrate 420 by an idler axle 65. The middle gear is driven by the input gear 62. The output gear 66 is connected to the housing 40 by an axle 67. A top end of the axle 67 is fixedly connected to the top plate 440 of the housing 40. A bottom end of the axle 67 passes through the substrate 420 of the housing 40 to connect with the planetary gear mechanism 70. The output gear 66 is driven by the middle gear 64. In at least one embodiment, the number of middle gears 64 can be one, two, more than two, or omitted based on available mounting space and actual requirements.

The planetary gear mechanism 70 includes a gear housing 72, a planet carrier 74 received in the gear housing 72, a sun gear 76 installed on the planet carrier 74, and a plurality of planet gears 78.

The gear housing 72 is carried by an interior of the lower wall 424 of the housing 40 of the transmission 30. A fixture block 73 protrudes from the outer wall surface of the gear housing 72. A fixture slot 425 is defined in the lower wall 424 corresponding to the fixture block 73. The fixture block 73 is locked and coupled in the corresponding fixture slot 425, thereby preventing rotation of the gear housing 72. A ring gear is formed in or fixed to an inner wall surface of the gear housing 72 to mesh with the planet gears 78. The planet carrier 74 is rotatably coupled to the bottom of the axle 67. The sun gear 76 is carried on the planet carrier 74 and further sleeved on the axle 67. The sun gear 76 is fixedly coupled to the output gear 66 of the transmission mechanism 60 and rotates synchronously with the output gear 66. The planet gears 78 are rotatably coupled to the planet carrier 74 via respective supporting stub axles (not shown). The planet gears 78 surround the sun gear 76. Each of the planet gears 78 simultaneously meshes with the sun gear 76 and the ring gear of the inner wall surface of the gear housing 72. The output member 79 is fixedly coupled to the planetary carrier 74 and rotates with the planet carrier 74. Preferably, the output member 79 passes through the lower wall 424 of the base 42 of the transmission 30 and passes through or at least is accessible through the casing 10. Preferably, the output member 79 is integrated with the carrier 74.

When activating the EPB system, the motor 20 drives the shaft 22 to rotate the output member. For example, in a clockwise rotation direction as shown in FIG. 8, rotation of the shaft 22 rotates the driving blocks 524 of the driving member 52 of the self-locking mechanism 50 in the clockwise direction. When the driving member 52 rotates, the first driving portion 526 of the driving block 524 contacts the stop block 544 of the driven member 54 and the second driving portion 528 of the driving block 524 contacts the rib 563 of the lock holder 56, thereby driving the driven member 54 and the lock holder 56 to rotate together synchronously. The synchronous rotation of the driving portion 524, the driven member 54 and the lock holder 56 causes the lock element 564 on the lock holder 56 to maintain a position corresponding to a center of the stop block 544 of the driven member 54. This prevents the lock element 564 from moving to the position corresponding to the two circumferential sides of the outer surface 545 of the stop block 544, and further prevents the lock element 564 being bound with the inner wall of the stationary member 80. The rotation of the driven member 54 by the driving member 52 is thus achieved smoothly.

Rotation of the driven member 54 rotates the input gear 62 of the transmission mechanism 60, and rotation of the input gear 62 is transmitted to the output gear 66 though the middle gear 64. Thereby, the sun gear 76 coupled to the output gear 66 is rotated and each of the planet gears 78, meshed the sun gear 76, revolve on its axis. Since the planet gears 78 are meshed with the ring gear of the gear housing 72, which cannot rotate, the planet gears 78 revolve both round the sun gear 76 and on their own axes, thereby driving the planet carrier 74 to rotate on its axis. The rotational speed of the planet carrier 74 is equal to the rotational speed of the planet gears 78 about the sun gear 76. Therefore, a high speed rotation of the motor 20 can be converted into a low speed rotation of the planet carrier 74. Thus the output member 79 coupled to the planet carrier 74 rotates at a lower rotational speed than the motor, for applying the brake.

Figure 9:
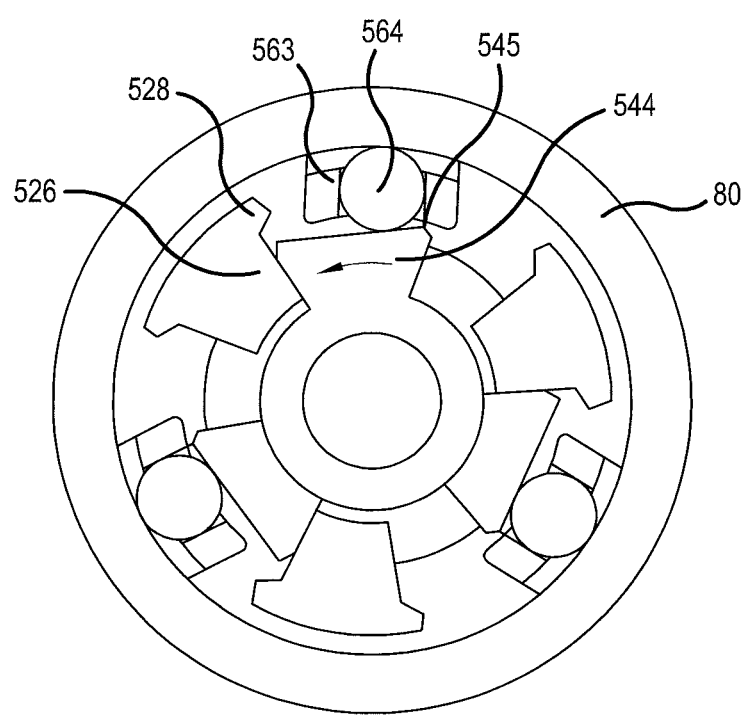
FIG. 9 is a schematic view of a second status of the self-locking mechanism after braking.

When the EPB system executes the braking function, as shown in FIG. 9, if the output member 79 executes a counter-rotation, the driven member 54 is rotated anticlockwise by the planetary gear mechanism 70 and the transmission mechanism 60. When rotation starts, because the driving block 524 of the driving member 52 is hard against the stop block 544 of the driven member 54, rotation of the driven member 54 drives the driving member 52 to rotate anticlockwise. That is, the driven member 54 drives the driving member 52 to rotate relative to the lock holder 56 as the lock holder is not rotated by the stop blocks 544 of the driven member. Since the distance between the outer surface 545 of the stop blocks 544 and the inner wall of the stationary member 80 gradually decreases from the center to the two circumferential sides of the outer surface 545, the lock element 564 of the lock holder 56 is substantially tangential to the center of the outer surface 545. With rotation of the driven member 54 relative to the lock holder 56, the location of contact between the lock element 564 and outer surface 545 is moved towards the side of the outer surface 545, trapping the lock element 564 between the outer surface 545 and the inner wall of the stationary member 80. Therefore, rotation of the driven member 54 is prevented, which reacts on the output member 79 though the transmission mechanism 60 and the planetary gear mechanism 70. Since rotation of the output member 79 is stopped, the braking function is maintained. Therefore, the actuator of the electric parking brake system can resist back driving by the counter-rotation of the output member 79. After applying the brake, the self-locking function maintains the brake in the active state until the motor is operated to release the brakes.

Figure 10:
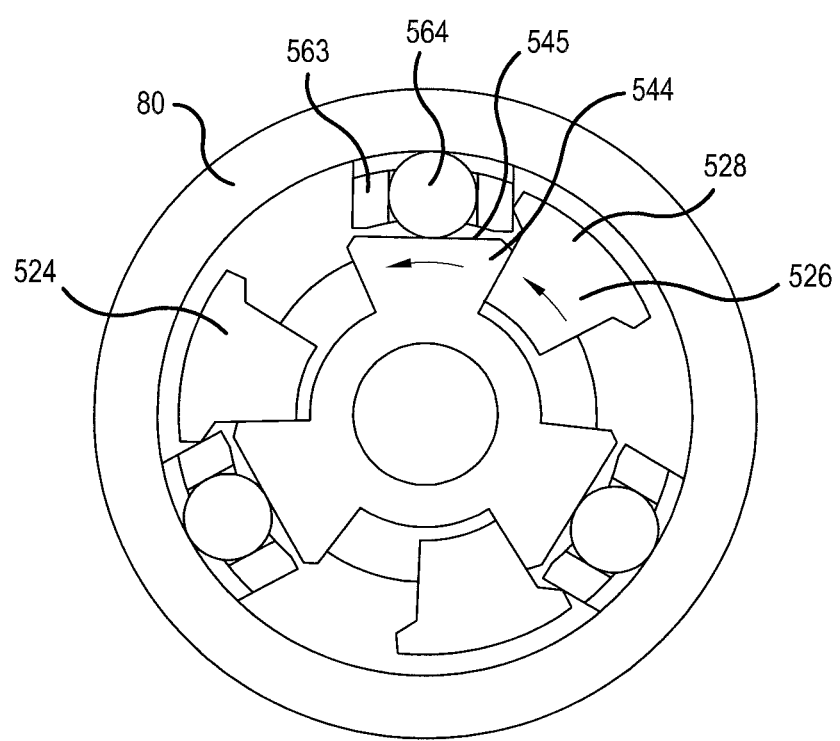
FIG. 10 is a schematic view of a third status of the self-locking mechanism when starting again after braking.

When the brake of the vehicle is to be released, as shown in FIG. 10, the motor 20 rotates the shaft 22 in the anticlockwise rotation direction. The counter-rotation of the shaft 22 rotates the driving member 52 of the self-locking mechanism 50 in the anticlockwise direction, thereby separating the driving block 524 and the stop block 544 of the driven member 54 which were in contact with the driving block 524, and further separating the driving block 524 and the rib 563 of the lock holder 56. Then the driven member 54 and the lock holder 56 are motionless. Once the driving member 52 has rotated a certain angle, the driving block 524 makes contact with another adjacent rib 563 of the lock holder 56, and further makes contact with another adjacent stop block 544 of the driven member 54. Because the circumferential length of the second driving portion 528 of the driving block 524 is greater than the circumferential length of the first driving portion 526 of the driving block 524, the second driving portion 528 would touch the rib 563 of the lock holder 56 earlier than the first driving portion 526. The second driving portion 528 drives the lock holder 56 to rotate relative to the driven member 54, for moving the lock element 564 to the center of the outer surface 545 of the stop block 544 and freeing the lock elements from contact with the stationary member. Then, the first driving portion 526 contacts the stop block 544 of the driven member 54, and rotates the driven member 54. Therefore, the driving member 52 drives the driven member 54 and the lock holder 56 to rotate together in the anticlockwise rotation direction once again, for driving the output member 79 to executing the counter-rotation through the transmission mechanism 60 and the planetary gear mechanism 70, to release the brake.

The clockwise rotation of the motor 20 is taken as an example to describe how the actuator of the electric parking brake system executes the braking function, the self-locking function after braking, and the release of the braking function. It should be understood that, the motor 20 being rotated anticlockwise also can execute above-mentioned functions when the driving between the output member 79 and the brake make corresponding changes. After the actuator of the EPB system executes the braking function, the system provides a barrier to limit the rotation of the driven member 54 through different contact locations between the stop block 544 of the driven member 54 and the lock element 564 of the lock holder 56, and friction between the lock element 564 and the inner wall of the stationary member 80 is utilized, to avoid the counter-rotation of the output member 79 being transferred to the driving member via the planetary gear mechanism 70, the transmission mechanism and the driven member 54. After operation of the motor, the self-locking function is applied automatically. Because the actuator can execute the self-locking function by itself after braking, a driving mode with low friction and high efficiency between the actuator and the brake can be realized.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A self-locking mechanism, comprising
a driving member;
a driven member arranged to drive the driving member;
a stationary member; and
a lock holder encircling the driving member and the driven member, the lock holder comprising:
a support base, and
a plurality of ribs arranged on an inner wall of the support base in a circumferential direction of the support base, an axial end portion of each rib extending into the stationary member;
wherein the driving member, the driven member, the stationary member, and the lock holder are coaxial with each other;
a lock element coupled to the axial end portion of each rib, and is positioned between an radially outer surface of the driven member and an inner wall of the stationary member;
a distance between the radially outer surface of the driven member and the inner wall of the stationary member gradually decreases from a center of the radially outer surface to opposite sides in a circumferential direction of the radially outer surface, a maximum distance between the radially outer surface of the driven member and the inner wall of the stationary member is greater than a diameter of the lock element, a minimum distance between the radially outer surface of the driven member and the inner wall of the stationary member is less than the diameter of the lock element,
wherein, when the driving member rotates the driven member, the lock holder is rotated by the driving member to maintain the lock element substantially positioned at the maximum distance; and
when the driven member is rotated by an external force, the radially outer surface of the driven member rotates relative to the lock element, thereby locking the lock element between the stationary member and the radially outer surface of the driven member preventing further rotation of the driven member.

2. The self-locking mechanism of claim 1, wherein the stationary member is stacked on an axial end of the support base of the lock holder.

3. The self-locking mechanism of claim 1, wherein at least one driving block is provided on the driving member, a plurality of stop blocks are provided on the driven member, the at least one driving block is disposed between the plurality of stop blocks, the at least one driving block is configured to engage the plurality of stop blocks to rotate the driven member, and an outer surface of each of the plurality of stop blocks is at least one portion of the radially outer surface of the driven member.

4. The self-locking mechanism of claim 3, wherein the driving member and the driven member are sleeved on a shaft in an axial direction in sequence, the driving member is fixedly coupled to the shaft to rotate with the shaft, and the driven member is rotatably coupled to the shaft.

5. The self-locking mechanism of claim 4, wherein the driving member further comprises a fixing portion, the fixing portion is fixedly coupled to the shaft, the at least one driving block extends radially outwardly from the fixing portion, an axial height of the at least one driving block is greater than an axial height of the fixing portion, a part of the at least one driving block extends from the fixing portion in the axial direction to define an installation space between the at least one driving block and the shaft, the driven member further comprises a connection portion extending into the installation space and rotatably sleeved on the shaft, and each of the plurality of stop blocks extends radially outwardly from the connection portion.

6. The self-locking mechanism of claim 3, wherein the at least one driving block comprises a plurality of driving blocks evenly distributed on the driving member in a circumferential direction of the driving member, the plurality of driving blocks and the plurality of stop blocks of the driven member are alternately positioned in the circumferential direction, the plurality of driving blocks and the plurality of ribs of the lock holder are alternately positioned in the circumferential direction.

7. The self-locking mechanism of claim 3, wherein a cross section of each of the plurality of stop blocks is in a shape of isosceles trapezoid, an outer surface of each of the plurality of stop blocks towards the plurality of ribs is a substantially planar surface, and the lock element is positioned between the outer surface of each of the plurality of stop blocks and the inner wall of the stationary member.

8. The self-locking mechanism of claim 3, wherein the at least one driving block comprises a first driving portion, and a second driving portion radially extending outwardly from the first driving portion, the first driving portion is configured to drive the plurality of stop blocks of the driven member, the second driving portion is configured to drive the plurality of ribs of the lock holder, a width of each first driving portion in the circumferential direction is less than a width of each second driving portion, two sides of each second driving portion protrude over the corresponding first driving portion.

9. The self-locking mechanism of claim 1, wherein each of the lock elements is substantially cylindrical, and an axis of each lock element is substantially parallel to an axis of the lock holder.

10. An actuator of an electric parking brake system, the actuator comprising a motor, an output member, and a transmission positioned between the motor and the output member, the transmission incorporating a self-locking mechanism comprising:
a driving member;
a driven member arranged to drive the driving member;
a stationary member; and
a lock holder encircling the driving member and the driven member, the lock holder comprising:
a support base, and
a plurality of ribs arranged on an inner wall of the support base in a circumferential direction of the support base, an axial end portion of each rib extending into the stationary member;

wherein the driving member, the driven member, the stationary member, and the lock holder are coaxial with each other;
a lock element coupled to the axial end portion of each rib, and is positioned between an radially outer surface of the driven member and an inner wall of the stationary member;
a distance between the radially outer surface of the driven member and the inner wall of the stationary member gradually decreases from a center of the radially outer surface to opposite sides in a circumferential direction of the radially outer surface, a maximum distance between the radially outer surface of the driven member and the inner wall of the stationary member is greater than a diameter of the lock element, a minimum distance between the radially outer surface of the driven member and the inner wall of the stationary member is less than the diameter of the lock element,
wherein, when the driving member rotates the driven member, the lock holder is rotated by the driving member to maintain the lock element substantially positioned at the maximum distance; and
when the driven member is rotated by an external force, the radially outer surface of the driven member rotates relative to the lock element, thereby locking the lock element between the stationary member and the radially outer surface of the driven member preventing further rotation of the driven member.

11. The actuator of claim 10, wherein the transmission further comprises a transmission mechanism and a planetary gear mechanism, the planetary gear mechanism comprises a gear housing, a sun gear, a planet carrier, and a plurality of planet gears, the sun gear, the planet carrier, and the plurality of planet gears are received in the gear housing, a fixture block protrudes from an outer surface of the gear housing for limiting rotation of the gear housing, a ring gear is arranged on an inner surface of the gear housing, the sun gear is fixedly coupled to an output gear of the transmission mechanism, the plurality of the planet gears are rotatably coupled to the planet carrier, each of the plurality of planet gears meshes with the sun gear and the ring gear, and the output member is coupled to the planet carrier.

12. The actuator of claim 10, wherein the stationary member is stacked on an axial end of the support base of the lock holder.

13. The actuator of claim 10, wherein at least one driving block is provided on the driving member, a plurality of stop blocks are provided on the driven member, the at least one driving block is disposed between the plurality of stop blocks, the at least one driving block is configured to engage the plurality of stop blocks to rotate the driven member, and an outer surface of each of the plurality of stop blocks is at least one portion of the radially outer surface of the driven member.

14. The actuator of claim 13, wherein the driving member and the driven member are sleeved on a shaft in an axial direction in sequence, the driving member is fixedly coupled to the shaft to rotate with the shaft, and the driven member is rotatably coupled to the shaft.

15. The actuator of claim 14, wherein the driving member further comprises a fixing portion, the fixing portion is fixedly coupled to the shaft, the at least one driving block extends radially outwardly from the fixing portion, an axial height of the at least one driving block is greater than an axial height of the fixing portion, a part of the at least one driving block extends from the fixing portion in the axial direction to define an installation space between the at least one driving block and the shaft, the driven member further comprises a connection portion extending into the installation space and rotatably sleeved on the shaft, and each of the plurality of stop blocks extends radially outwardly from the connection portion.

16. The actuator of claim 13, wherein the at least one driving block comprises a plurality of driving blocks evenly distributed on the driving member in a circumferential direction of the driving member, the plurality of driving blocks and the plurality of stop blocks of the driven member are alternately positioned in the circumferential direction, the plurality of driving blocks and the plurality of ribs of the lock holder are alternately positioned in the circumferential direction.

17. The actuator of claim 13, wherein a cross section of each of the plurality of stop blocks is in a shape of isosceles trapezoid, an outer surface of each of the plurality of stop blocks towards the plurality of ribs is a substantially planar surface, and the lock element is positioned between the outer surface of each of the plurality of stop blocks and the inner wall of the stationary member.

18. The actuator of claim 13, wherein the at least one driving block comprises a first driving portion, and a second driving portion radially extending outwardly from the first driving portion, the first driving portion is configured to drive the plurality of stop blocks of the driven member, the second driving portion is configured to drive the plurality of ribs of the lock holder, a width of each first driving portion in the circumferential direction is less than a width of each second driving portion, two sides of each second driving portion protrude over the corresponding first driving portion.

19. The actuator of claim 10, wherein each of the lock elements is substantially cylindrical, and an axis of each lock element is substantially parallel to an axis of the lock holder.

* * * * *